(12) United States Patent
Bujewicz et al.

(10) Patent No.: US 11,566,722 B2
(45) Date of Patent: Jan. 31, 2023

(54) SERVO VALVE

(71) Applicant: Hamilton Sundstrand Corporation, Charlotte, NC (US)

(72) Inventors: Maciej Bujewicz, Wroclaw (PL); Marcin Korczynski, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1 day.

(21) Appl. No.: 17/230,245

(22) Filed: Apr. 14, 2021

(65) Prior Publication Data

US 2021/0332907 A1 Oct. 28, 2021

(30) Foreign Application Priority Data

Apr. 24, 2020 (PL) .......................................... 433667

(51) Int. Cl.
  *F16K 31/06* (2006.01)
  *F16K 11/07* (2006.01)
  *F16K 31/08* (2006.01)
  *F16K 11/076* (2006.01)

(52) U.S. Cl.
  CPC ........ *F16K 31/0613* (2013.01); *F16K 11/076* (2013.01); *F16K 31/082* (2013.01)

(58) Field of Classification Search
  CPC ... F16K 31/082; F16K 31/0613; F16K 11/076
  See application file for complete search history.

(56) References Cited

U.S. PATENT DOCUMENTS

| 4,046,061 A | 9/1977 | Stokes |
| 5,467,800 A * | 11/1995 | Sallas .................. F15B 21/125 91/39 |
| 5,954,093 A * | 9/1999 | Leonard ............. F15B 13/0406 137/625.22 |
| 6,269,838 B1 | 8/2001 | Woodworth et al. |
| 6,786,238 B2 | 9/2004 | Frisch |
| 7,322,375 B2 * | 1/2008 | Goldfarb ............... F16K 11/085 137/625.22 |
| 9,303,781 B2 | 4/2016 | Veilleux, Jr. |
| 9,309,900 B2 | 4/2016 | Kopp |
| 9,702,478 B2 * | 7/2017 | Frick .................. F15B 13/0433 |
| 2015/0047729 A1 | 2/2015 | Kopp et al. |
| 2018/0346128 A1 | 12/2018 | Kozlowski et al. |

FOREIGN PATENT DOCUMENTS

| GB | 2104249 A * | 3/1983 | .......... F15B 13/0406 |
| GB | 2104249 A | 3/1983 | |

* cited by examiner

*Primary Examiner* — Kevin R Barss
(74) *Attorney, Agent, or Firm* — Cantor Colburn LLP

(57) ABSTRACT

A servo valve includes a fluid transfer valve assembly comprising a supply port and a control port; a valve spool arranged to regulate flow of fluid from the supply port to the control port in response to a control signal; and a drive means configured to move the valve spool relative to the fluid transfer assembly in response to the control signal to regulate the fluid flow. The drive means is arranged to rotate the spool relative to the fluid transfer assembly, the spool provided with openings arranged to selectively align with or block flow channels in the fluid transfer assembly according to the direction and degree of rotation of the spool.

10 Claims, 5 Drawing Sheets

SERVO VALVE

FOREIGN PRIORITY

This application claims priority to Polish Application No. P.433667 filed Apr. 24, 2020, the entire contents of which is incorporated herein by reference.

TECHNICAL FIELD

The present disclosure relates to servo valves used to transfer quantities of, or manage the flow of fluids, e.g., oil, fuel, or air.

BACKGROUND

Servo valves find a wide range of applications for controlling air, fuel, oil or other fluid flows to effect driving or control of another part, e.g., an actuator or in fuel control systems.

A servo valve assembly may include a drive assembly such as a motor controlled by a control current which controls fluid flow to or from an actuator. Generally, a servo valve transforms an input control signal into movement of an actuator cylinder. The actuator controls another component which, in some examples, may be a valve. In other words, a servo valve acts as a controller, which commands the actuator, which changes the position of a valve's flow modulating feature.

Such mechanisms are used, for example, in various parts of aircraft where the management of fluid/air flow is required, such as in engine fuel control, oil flow, engine bleeding systems, anti-ice systems, air conditioning systems and cabin pressure systems. Servo valves also are widely used to control the flow and pressure of pneumatic and hydraulic fluids to an actuator, e.g. to control moving parts such as flight control surfaces, flaps, landing gear, and in applications where accurate position or flow rate control is required. Some examples of applications are aircraft, automotive systems and in the space industry.

Conventionally, servo valve systems operate by obtaining pressurised fluid from a high pressure source which is transmitted through a load from which the fluid is output as a control fluid. Various types of servo valves are known, examples of which are described in UK Patent Application No. GB 2104249A, U.S. Patent Application Publication No. 2015/0047729 and U.S. Pat. No. 9,309,900.

Electrohydraulic servo valves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve by controlling the flow of fluid acting on the spool. Movement of the spool causes alignment between the ports and fluid channels to be changed to define different flow paths for the control flow. Such systems are known in the art and will not be described further in detail.

Such conventional systems will be described in more detail below with reference to FIG. 1.

Servo valves are often required to operate at various pressures and temperatures and so components parts need to be large enough to handle the large amounts of fluid needed to operate under such conditions. For example, in fast acting air valve actuators, relatively large amounts of fluid are required depending on the size of the actuator and the valve slew rate. For such high flow rates, however, large valve orifice areas are required. For 'flapper' type servo valves, problems arise when dealing with large flows due to the fact that flow force acts in the direction of the flapper movement and the motor is forced to overcome the flow forces. For clevis-like metering valves such as those described in U.S. Pat. Nos. 4,046,061 and 6,786,238, the flow forces, which are proportional to the flow, act simultaneously in opposite directions so that the clevis is balanced and centered. The clevis, however, needs to be big due to the requirement for bigger orifices to handle larger flows.

Jet pipe servo valves are types of valves that provide an alternative to 'flapper'—type servo valves. Jet pipe servo valves are usually larger than flapper type servo valves but are less sensitive to contamination. In jet pipe systems, fluid is provided via a jet pipe to a nozzle which directs a stream of fluid at a receiver. When the nozzle is centered—i.e. there is no current from the motor so it is not caused to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other, which causes the spool to shift. The spool shifts until the spring force of a feedback spring produces a torque equal to the motor torque. At this point, the nozzle is centred again, pressure is equalized on both sides of the receiver and the spool is held in the centered position. A change in motor current moves the spool to a new position corresponding to the applied current.

Conventional systems are fairly large, bulky systems with a complex construction of several moving parts and channels, which means that there are several potential points of failure. The fluid flow channels and long fluid paths slow down the response time for the position of the spool to change in response to changes in the control signal, and can also become blocked and unreliable.

There is a need for improved servo valve arrangements that can handle large fluid flows effectively and at high operation frequency, but with fewer expensive and complex parts and which are simple to manufacture and assemble, whilst retaining a compact and reliable, responsive design.

The present disclosure provides a servo valve assembly as defined in claim 1. Also provided is a method of driving a valve spool of a servo valve

BRIEF DESCRIPTION OF THE DRAWINGS

Preferred embodiments will now be described with reference to the drawings.

DETAILED DESCRIPTION

Servo valves are generally used when accurate position control is required, such as, for example, control of a primary flight surface. Servo valves can be used to control pneumatic or hydraulic actuators or motors. They are common in industries which include, but are not limited to, automotive systems, aircraft and the space industry.

A known type of servo valve has a flapper and nozzle arrangement.

Figure 1:
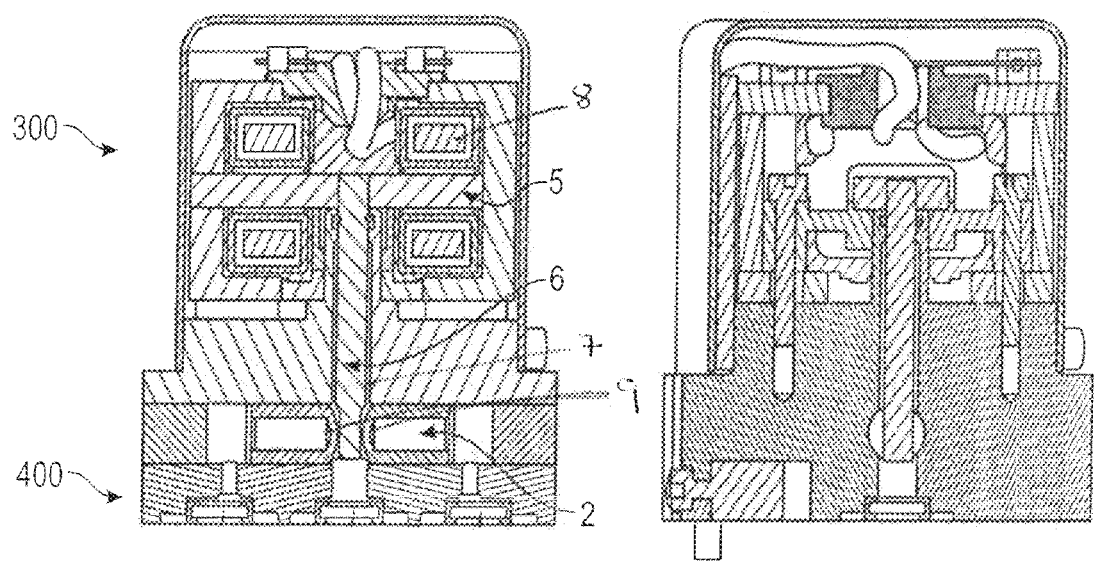
FIG. 1 is a sectional view of a conventional flapper type servo valve assembly.
Figure 2:
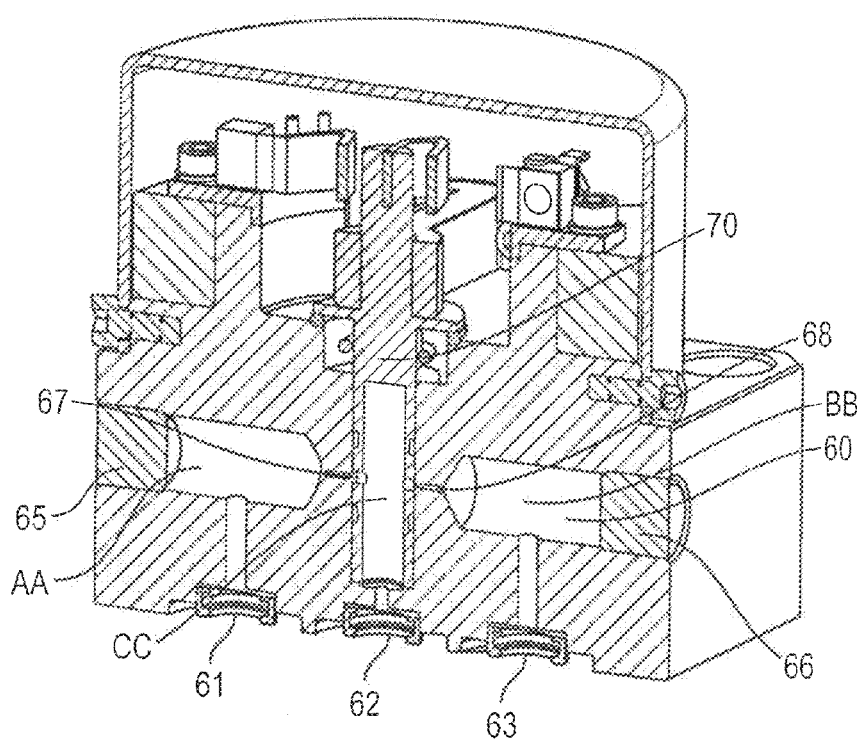
FIG. 2 is a perspective view of a section through the servo valve assembly according to the present disclosure.

FIG. 1 shows generally a known arrangement of a flapper and nozzle servo valve. The assembly comprises a torque motor subsystem 300 and a flapper-nozzle subsystem 400. In more detail, the assembly comprises a flapper 6 disposed in a flapper cavity 7, a pair of nozzles 9 disposed in a nozzle housing, and an electromagnet 8 surrounding an armature 5. The armature has opposed tips, which protrude through gaps in a housing surrounding the electromagnet, and which are arranged to leave spaces between the armature and the housing.

The electromagnet is connected to an electrical input (not shown) and the armature 5 is connected in a perpendicular manner to the flapper 6, or is an integral part of the flapper—the integral part being perpendicular to the flapper. The electromagnet includes coils that surround the armature and a set of permanent magnets that surround the coils. When a current is applied to the coils from the electrical input, magnetic flux acting on the ends of the armature is developed. The direction of the magnetic flux (force) depends on the sign (direction) of the current. The magnetic flux will cause the armature tips to be attracted to the electromagnet (current direction determines which magnetic pole is attracting and which one is repelling) thus varying the size of the spaces. This magnetic force creates an applied torque on the flapper, which is proportional to applied current. The flapper rotates and interacts with the nozzles.

Nozzles 9 are housed within a respective nozzle cavity in the housing, and comprise a fluid outlet and fluid inlet. Housing also has a port, which allows communication of fluid to the nozzles. The flapper comprises a blocking element at an end thereof which interacts with fluid outlets of nozzles to provide metering of fluid from the fluid outlets to a fluid port in the housing. Fluid port in turn allows communication of fluid pressure downstream to a spool valve and actuator arrangement (not shown). The positioning of the flapper between nozzles (controlled by the movement of the armature via electromagnet) will control the amount of fluid pressure communicated to the spool valve and actuator arrangement (not shown), which can be used to control actuator movement.

Although the flapper and nozzle type of servo valve arrangement shown in FIG. 1 can be effective at controlling an actuator, it has been found that limitations nevertheless exist. For example: in order to provide the correct limitations on flapper and armature movement, the spaces must be calibrated to very tight tolerances, as must the spacing of the nozzles from the flapper. Moreover, there is also a general desire to reduce servo valve weight and simplify its manufacture, construction and operation, as well as improve the operational pressures and frequencies that may be realised with such servo valve arrangements.

The apparatus of the present disclosure eliminates many of the problems of existing assemblies. This will be described with reference to FIGS. 2 to 8.

The servo valve assembly comprises a drive assembly 50 and a spool assembly. The spool assembly comprises a tubular body 60 and a spool 70 extending from the drive assembly into the tubular body 60.

The body 60 has a supply port 61, a control port 62 and a return port 63 providing ports into/out of the tubular body interior. End plugs 65,66 seal the ends of the tubular body 60. The supply port 61 connects a supply fluid to a first chamber AA of the tubular body 60, sealed at the outer end by end plug 65. The return port 63 provides a fluid outlet from a chamber BB at the other end of the body 60 closed by end plug 66. Chamber AA and chamber BB are fluidly connected by a chamber CC defined by the spool 70 extending into the body 60 between chambers AA and BB as will be described further below. Chamber AA is fluidly connected to chamber CC via a first channel 67 and a first spool opening 71 in the spool 70. Chamber BB is fluidly connected to chamber CC via a second channel 68 and a second spool opening 72 in the spool 70.

When the first spool opening 71 is aligned with the first channel 67, fluid flows from the supply port through chamber AA, through channel 67 into chamber CC and out of the control port 62. When the second spool opening 71 is aligned with the second channel 68, a fluid flow path is defined between the control port 62 and the return port 63 via chambers CC and BB and channel 68. Thus, fluid flow through the valve can be controlled as required to control actuators or valves such as, in a fuel supply system, a hydraulic cylinders or a throttle in a fuel inlet channel (not shown).

Figure 7:
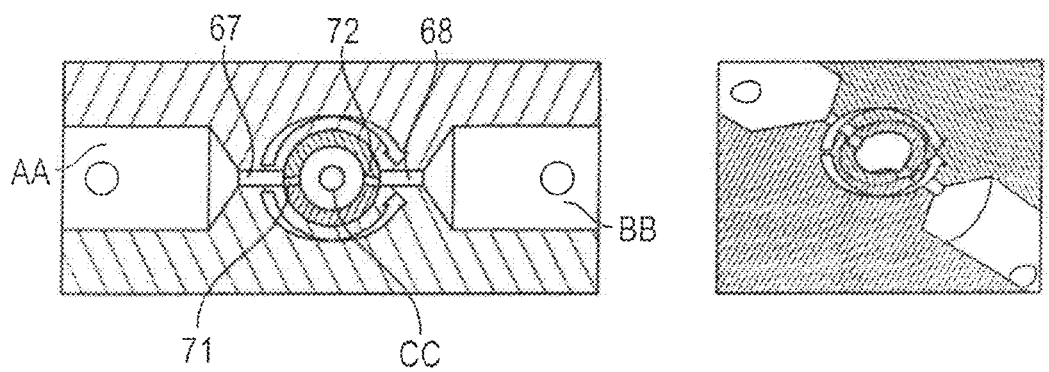
FIG. 7 shows in detail the spool part of the assembly of FIGS. 2 to 5.

The first and second spool openings 71,72 are formed in the spool 70, that extends into the body 60 from the drive system 50, as can be best seen in FIG. 7, such that when opening 71 is aligned with channel 67 and so channel 67 is open, second opening 72 is not aligned with channel 68 and so channel 68 is closed, and vice versa. According to the desired fluid flow, the spool 70 is rotated by the drive assembly as will be described further below, to align the appropriate spool opening and channel. Arrows X,Y show rotation of the spool.

Figure 8:
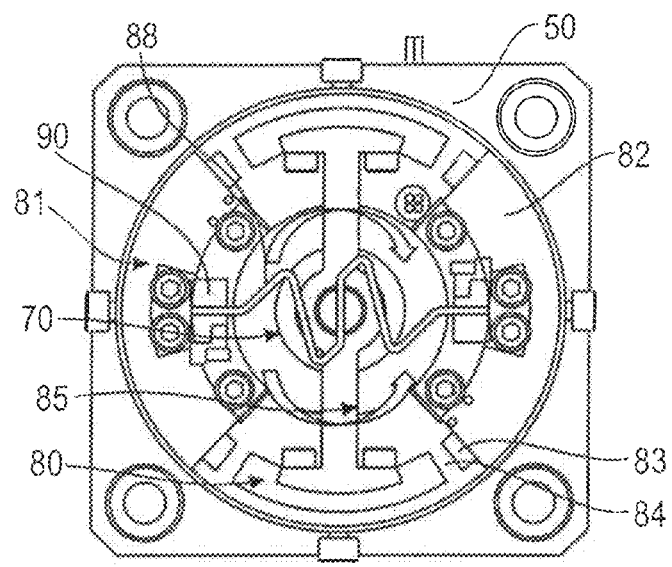
FIG. 8 is a top view showing a drive assembly according to the disclosure.

The preferred drive mechanism for rotating the spool 70 will now be described with particular reference to FIGS. 3 and 8. As can be best seen in FIG. 3, the drive assembly 50 is mounted on top of the body 60. The spool 70 extends from the drive assembly into the body 60 and is caused to rotate within the body as shown by arrows X and Y relative to the body 60.

The preferred drive assembly comprises permanent magnets 80 alternating with coils 81 around the drive assembly. The coils 81 each comprise a winding 82 around a respective core 83. An air gap 84 is provided between each core and the adjacent permanent magnet 80.

A connector 85 is mounted across the drive assembly in engagement with the permanent magnets 80 so as to be moved with movement of the magnets. The spool 70 is fixedly connected to and extends from the connector 85. The spool 70 is preferably connected to the connector 85 via a washer 86 and seal ring 87 so that the connector and spool rotate together. In the preferred embodiment, the spool is connected to the connector via a washer slider 86 which means that the components can be press-fit and brazing or welding is not required. The seal 87 is preferably a Simering seal as is known for sealing rotary joints, but other designs are possible. A spring 88 is provided to bias the connector and spool in the neutral position against the force of the magnets.

When the valve is to be operated, current (in a direction and amount determined according to the desired fluid flow, and according to a control command from a controller (not shown) is applied to the drive assembly coils 81. The coil core 83 magnetises and according to its polarity, attracts the permanent magnet adjacent to one end of the core and repels the permanent magnet adjacent the opposite end of the core. This causes the connector 85 and, hence, the spool 70 to rotate in a direction determined by the applied current. The rotation of the spool will then align either the first channel and the first spool opening or the second spool opening and the second channel to create the desired fluid flow path through the valve body. By changing the polarity of the coil, the direction of rotation (X or Y) is changed.

The connector is biased to its neutral position by the spring 88 which counteracts the magnetic force from the coils.

The assembly may also be provided with a coil and spring lock arrangement 90 to ensure positioning of the spool 70 and air gap adjustment. In the example shown, the coil and spring lock is a sliding element 90 mounted on the body 60. The element is mounted e.g. by screws with a small amount of clearance, such that it is able to move slightly to compensate for spool rotation and determine the required air gaps.

Setting the spool in the neutral position is required during a calibration process when both flow channels 67, 68 are half-closed. The connector and spring should be configured such that in the neutral position the flow is the same in both directions. This can be achieved by rotating the connector and spool and fixing the coil and spring lock 90 at the appropriate neutral position in a calibration procedure. The fluid flow is checked and when flow in both directions is equal, the coil and spring lock is secured e.g. by tightening the screws that fasten it to the body 60. Next in the calibration process, the air gaps need to be set. This is done by adjusting the position of the coils. When the air gaps are correct, the position of the coils is secured e.g. by fastening screws or the like.

Figure 6:
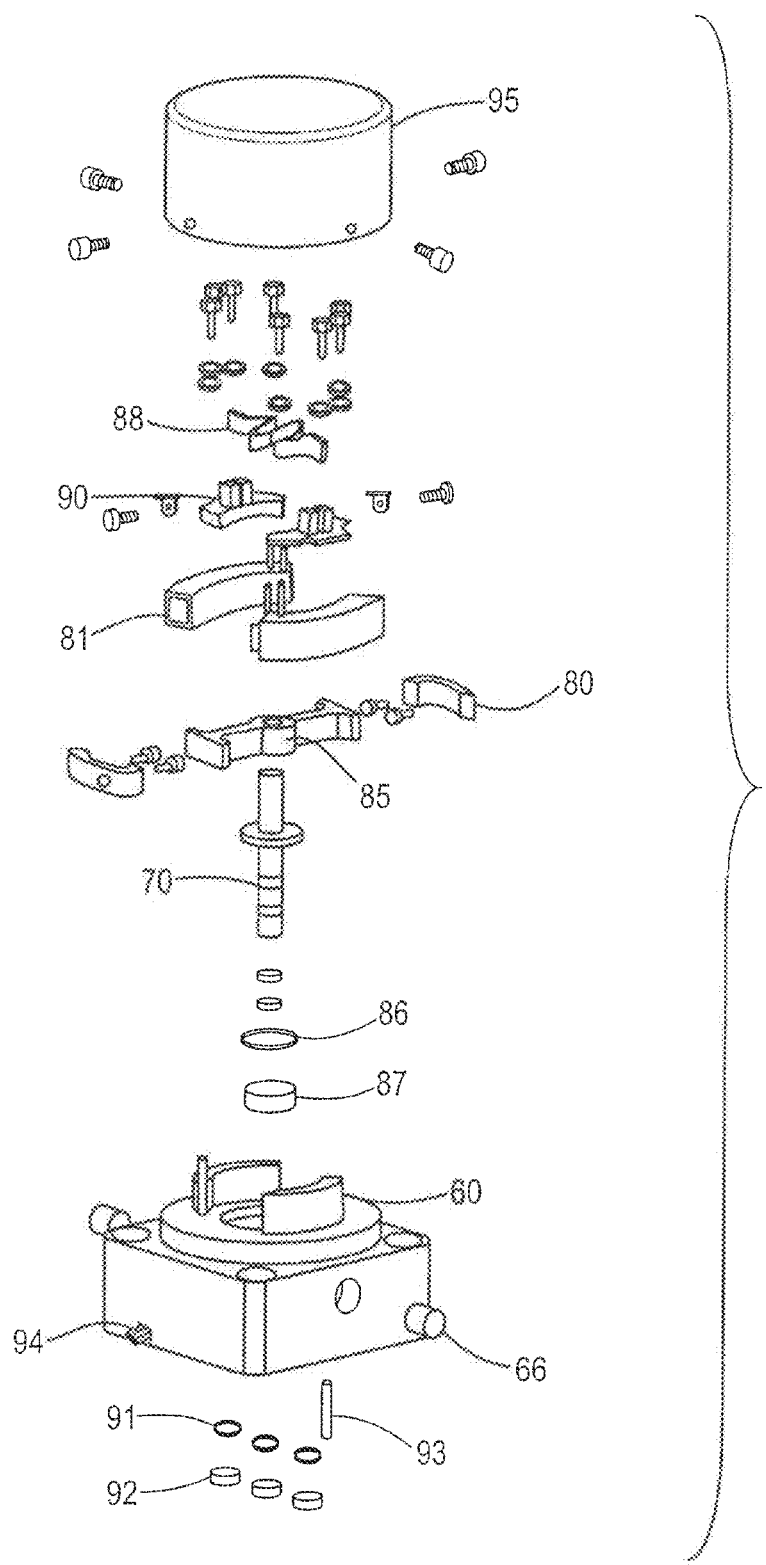
FIG. 6 is an exploded view of the assembly of FIGS. 2 to 5.

Further preferred elements of the assembly can be seen in, in particular, FIG. 6. For example, filter components 91 can be provided at the ports 61, 62, 63 to prevent debris or contaminants in the fluid path. The filter components may be retained by screen rings 92.

The figures also show a pin 93 that may be provided to assist in positioning the assembly onto another part such as a pump or manifold e.g. of a fuel system.

Figure 3:
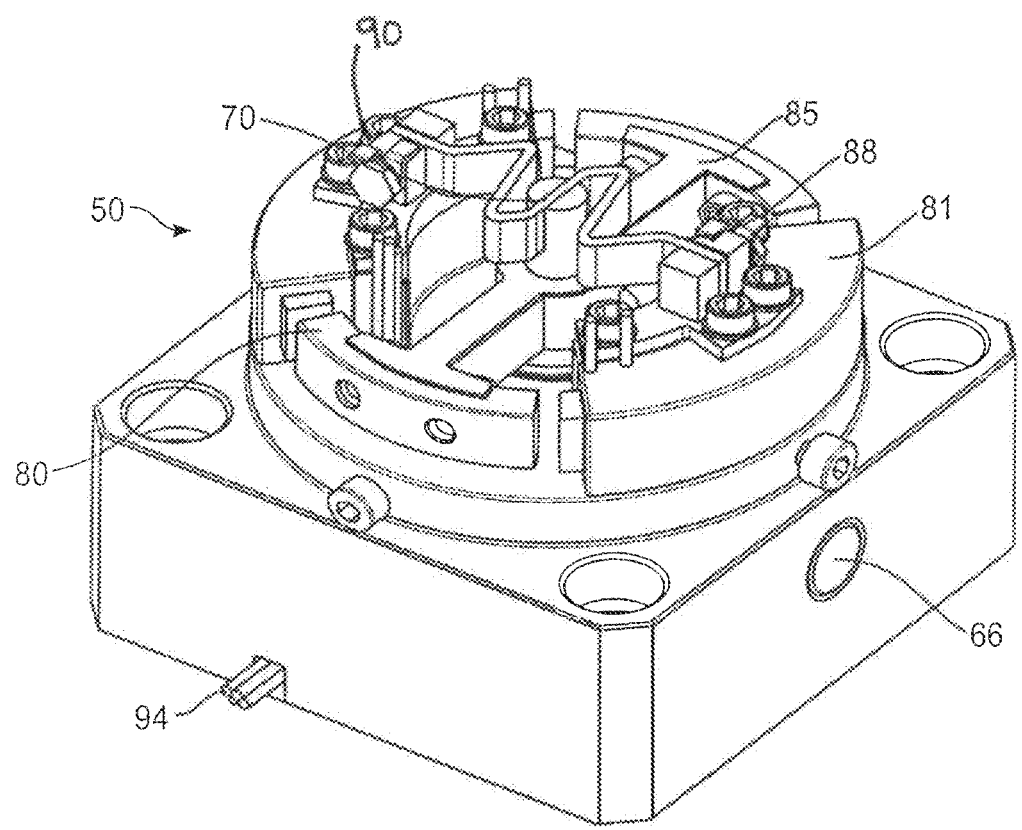
FIG. 3 shows a perspective view of the servo valve assembly of FIG. 2.
Figure 4:
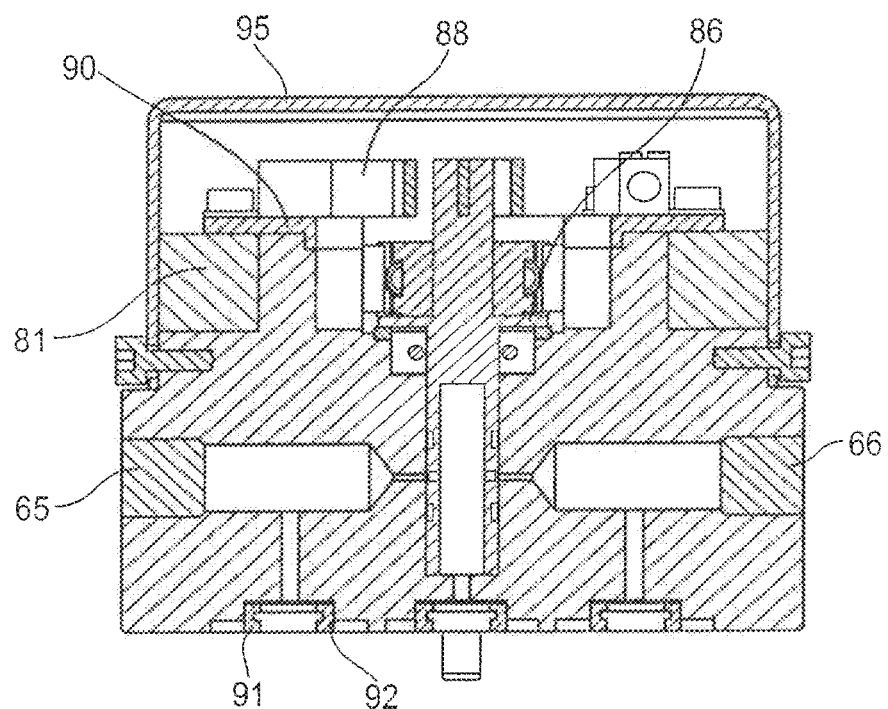
FIG. 4 corresponds to FIG. 2 but as a plane sectional view.
Figure 5:
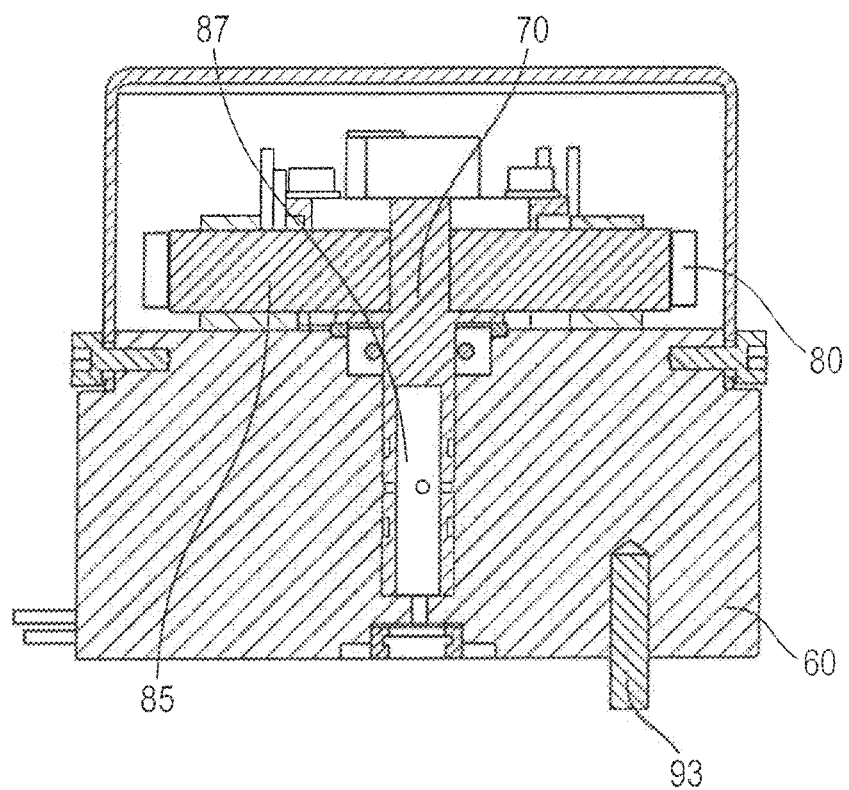
FIG. 5 corresponds to FIG. 3 but as a plane sectional view.

The coil wires 94 are preferably led out of the body 60 as shown in FIGS. 3 and 6.

The drive assembly is preferably closed by a cover 95

The arrangement of this disclosure provides a servo valve assembly with fewer expensive and complex parts and which is simpler to manufacture and assemble.

Although this disclosure has been described in terms of preferred examples, it should be understood that these examples are illustrative only and modifications and alterations are possible within the scope of the claims.

The invention claimed is:

1. A servo valve comprising:
   a fluid transfer valve assembly comprising a supply port and a control port;
   a valve spool arranged to regulate flow of fluid from the supply port to the control port in response to a control signal; and
   a drive means configured to move the valve spool relative to the fluid transfer assembly in response to the control signal to regulate the fluid flow;
   wherein:
   the drive means is arranged to rotate the valve spool relative to the fluid transfer assembly;
   the spool is provided with first and second openings arranged to selectively align with or block respective first and second flow channels in the fluid transfer valve assembly according to a direction and degree of rotation of the valve spool by the drive means;
   wherein the fluid transfer valve assembly extends in a first direction;
   wherein the fluid transfer valve comprises:
      a first chamber AA in fluid flow engagement with the supply port and, via first flow channel and first opening via the valve spool, with the control port; and
      a second chamber BB in fluid flow engagement with the supply port and a return port via the second flow channel and second opening via the valve spool;
   wherein the valve spool comprises:
      a tubular member defining a fluid chamber CC and extending between the first chamber and the second chamber in a direction substantially perpendicular to the first direction, such that rotation of the spool is about an axis substantially perpendicular to the first direction and such that in a first position of rotation of the valve spool, a first valve spool opening aligns with an opening from the first chamber CC to define a first fluid flow path from the control port, through the first chamber, through the first valve spool opening, into the fluid chamber CC and through the control port.

2. A servo valve as claimed in claim 1, wherein in a second position of rotation of the valve spool, the first valve spool opening is not aligned with the opening from the first chamber, thus closing off the first fluid flow path, and a second valve spool opening is aligned with an opening to the second chamber defining a fluid flow path between the fluid chamber and the second chamber.

3. A servo valve as claimed in claim 1, wherein the drive means comprises an arrangement of permanent magnets alternating with coils, the permanent magnets separated from adjacent coils by an air gap.

4. A servo valve as claimed in claim 3, further comprising a connector element in engagement with the permanent magnets and to which the valve spool is attached to extend from the connector element.

5. A servo valve as claimed in claim 3, further comprising:
   a spring to bias the drive means to a neutral position.

6. A servo valve as claimed in claim 3, further comprising:
   a spring lock arrangement to set a position of the valve spool.

7. A servo valve as claimed claim 1, whereby the fluid transfer valve assembly is enclosed in a first housing and the drive means is enclosed in a second housing mounted on top of the first housing, and the valve spool extends from the second housing to the first housing.

8. A method of operating the servo valve as recited in claim 1, the method comprising:
   rotating the valve spool to adjust alignment of openings in the valve spool with fluid chambers of a fluid transfer assembly to define fluid flow paths according to a control signal.

9. The method of claim 8, whereby the valve spool is rotated by rotation of an assembly of permanent magnets separated by coils and separated from the coils by air gaps, in response to the control signal.

10. The method of claim 9, further comprising performing an initial calibration process, whereby the valve spool is set in a neutral position and the air gaps are set accordingly.

* * * * *